Jan. 9, 1968  K. F. FERGUSON  3,362,243

ENGINE COOLING FAN ASSEMBLY

Original Filed April 5, 1965  2 Sheets-Sheet 1

INVENTOR.
KENNETH F. FERGUSON

BY HIS ATTORNEYS
HARRIS, KIECH, RUSSELL & KERN

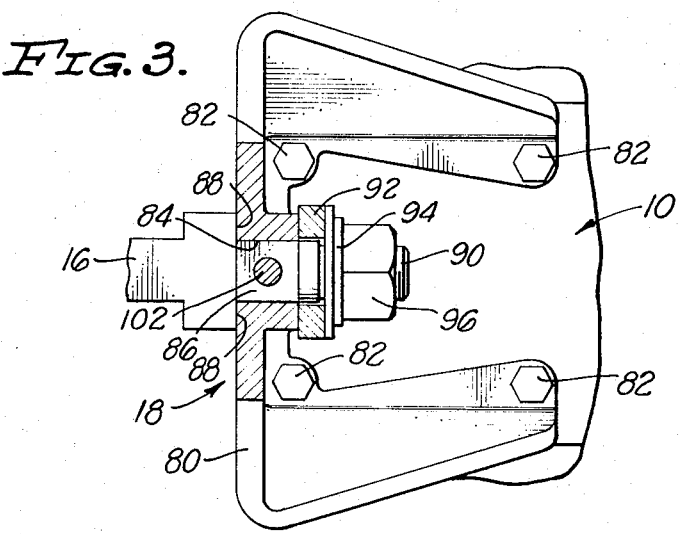
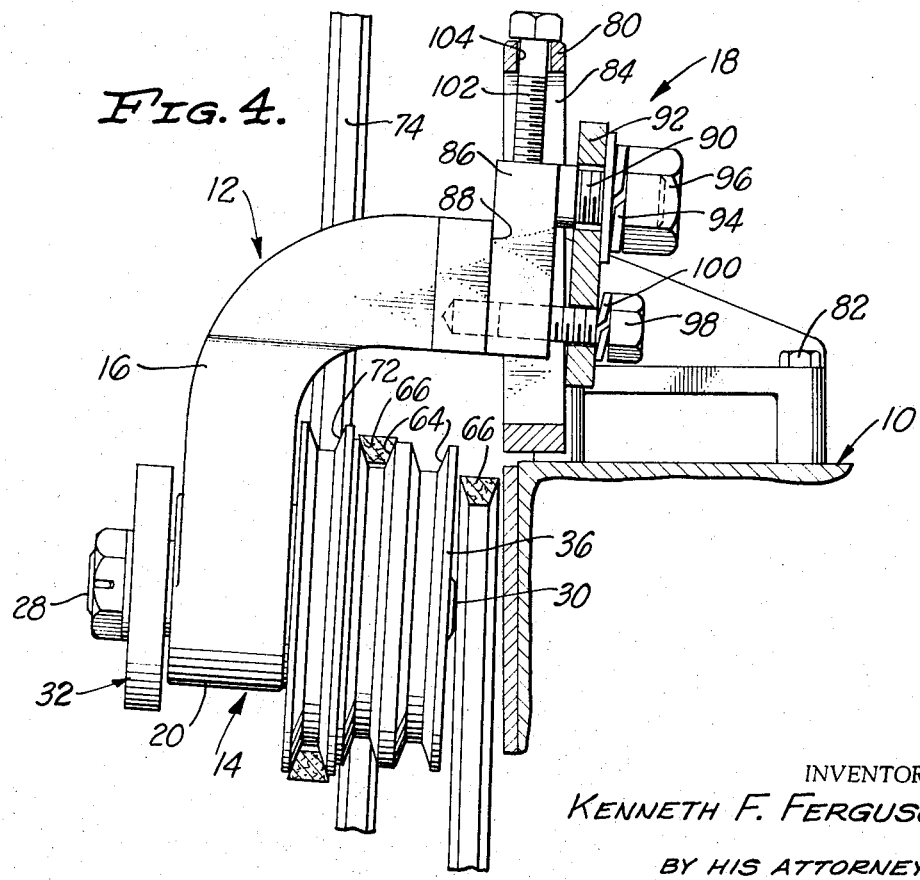

United States Patent Office 3,362,243
Patented Jan. 9, 1968

3,362,243
ENGINE COOLING FAN ASSEMBLY
Kenneth F. Ferguson, Placentia, Calif., assignor to Hunt Foods and Industries, Inc., Fullerton, Calif., a corporation of Delaware
Continuation of application Ser. No. 445,379, Apr. 5, 1965. This application Feb. 14, 1967, Ser. No. 616,130
4 Claims. (Cl. 74—242.14)

This application is a continuation of application Ser. No. 445,379, filed Apr. 5, 1965, now abandoned.

The present invention relates in general to a cooling fan assembly for an internal combustion engine of the reciprocating type, and a primary object of the invention is to provide means for mounting a cooling fan on such an engine in an optimum location relative to a radiator associated with the engine.

Considering the background of the invention, in order to reduce truck operating costs, particularly for urban and short-run interurban operation. I substituted a Cummins V6-200 four-cycle diesel engine, manufactured by Cummins Engine Company, Inc., Columbus, Ind., for the standard or original equipment V-8 gasoline engine of a 1961 Ford C-1000 cab-over-engine tractor, manufactured by Ford Motor Company. To minimize modifications of this truck in converting it to diesel power, I utilized as many of the standard components of the truck as possible, including the transmission and the components of the drive train rearwardly thereof. Thus, I merely mounted the standard transmission for this truck on the diesel engine mentioned, utilizing a suitable clutch to couple the transmission to the engine. Also, I mounted the engine in the truck utilizing the engine-mount locations provided on the engine by its manfuacturer. Initially, extremely severe vibration transmission from the engine to the truck itself resulted, and such vibration transmission was successfully eliminated in the manner disclosed and claimed in my copending application Ser. No. 358,467, filed Apr. 9, 1964, and now Patent No. 3,289,781, granted Dec. 6, 1966.

To cool the aforementioned Cummins engine satisfactorily when installed in the Ford tractor in question, I developed an improved radiator which is disclosed and claimed in my copending application Ser. No. 353,066, filed Mar. 19, 1964, and now Patent No. 3,254,707, granted June 7, 1966, and further developed an improved mounting system for such radiator, which is disclosed and claimed in my copending application Ser. No. 391,579, filed Aug. 24, 1964, and now Patent No. 3,248,076, granted Apr. 26, 1966.

When the aforementioned Cummins engine and my aforementioned radiator were mounted in the Ford tractor in question, the cooling fan assembly with which the engine was originally equipped positioned the cooling fan in a location which was too high, relative to the radiator, to achieve optimum air flow through the radiator. The present invention overcomes this difficulty by providing a cooling fan assembly which, in the particular installation under consideration, lowers the cooling fan into a location nearer the center of the core of the radiator so as to achieve optimum air flow through the core for optimum cooling. However, it will be understood that the present invention is not limited to the particular tractor-engine-radiator combination hereinbefore outlined, but may be utilized in connection with any engine-radiator combination requiring relocation of the cooling fan to achieve improved heat transfer.

An important object of the invention is to provide a cooling fan assembly which positions the fan in the desired location relative to the radiator, but which is mounted on the engine in the same location as the cooling fan assembly with which the engine was originally equipped. Thus, relocating the cooling fan in accordance with the invention requires no modification of the engine itself, which is an important feature.

More specifically, an important object of the invention is to provide a cooling fan assembly which includes a mounting bracket securable to the engine in the same location as the mounting bracket of the cooling fan assembly with which the engine was originally equipped, and which includes a cooling-fan hub assembly positioned in the desired location relative to the radiator by means of a supporting arm connected to the mounting bracket.

Another object of the invention is to provide means adjustably connecting the supporting arm to the mounting bracket so as to adjust the tension in a belt or belts trained over a pulley or pulleys forming part of the cooling-fan hub assembly. A related object is to provide an installation wherein the pulley or pulleys are normally located too close to the engine to permit installation or removal of a corresponding belt or belts, and to provide an adjustable connection between the mounting bracket and the supporting arm which permits movement of the pulley or pulleys away from the engine to provide clearance for the installation or removal of the belt or belts.

Another important object of the invention is to provide a cooling-fan hub assembly which includes a large-diameter bearing located substantially midway between the forward and rearward ends of the pulley or pulleys of the hub assembly. The use of such a large-diameter bearing located substantially midway between the forward and rearward ends of the pulley or pulleys minimizes bearing wear due to the tension in the belt or belts trained around the pulley or pulleys, which is an important feature.

A further object of the invention is to utilize for the bearing discussed in the preceding paragraph one which is capable of sustaining forward thrust loads, as well as radial loads, whereby it resists the forward thrust imposed by the cooling fan itself.

Still another object is to provide another, smaller bearing located forwardly of the large-diameter bearing mentioned and capable of sustaining radial and rearward thrust loads, such smaller bearing cooperating with the large-diameter bearing to restrain the cooling-fan shaft against axial movement.

Still more specifically, an object of the invention is to provide a cooling-fan hub assembly which includes: a supporting member having a forward end and having a rearward end of circular cross section; the supporting member having an opening therethrough from its forward end to its rearward end; the opening being of circular cross section at least at its forward end; a shaft projecting axially through the opening and having forward and rearward ends; a forwardly-facing cup-shaped pulley connected to the rearward end of the shaft and encompassing the rearward end of the supporting member; a bearing capable of sustaining radial and forward thrust loads encompassing the rearward end of the supporting member and interposed between the supporting member and the pulley substantially midway between the forward and rearward ends of the pulley; another bearing capable of sustaining radial and rearward thrust loads located within the opening at the forward end thereof and interposed between the supporting member and the shaft; and means on the shaft at the forward end thereof for mounting a fan thereon.

The foregoing objects, advantages, features and results of the present invention, together with various other objects, advantages, features and results of the invention which will be evident to those skilled in the art to which it relates in the light of this disclosure, may be achieved with the exemplary embodiment and installation of the invention described in detail hereinafter and illustrated in the accompanying drawings, in which:

FIG. 3 is a sectional view taken as indicated by the arrowed line 3—3 of FIG. 2; and FIG. 4 is a view similar to FIG. 2, but illustrating the manner in which the cooling-fan hub assembly of the invention may be tilted to provide clearance between it and the engine for installation or removal of belts.

Figure 1:
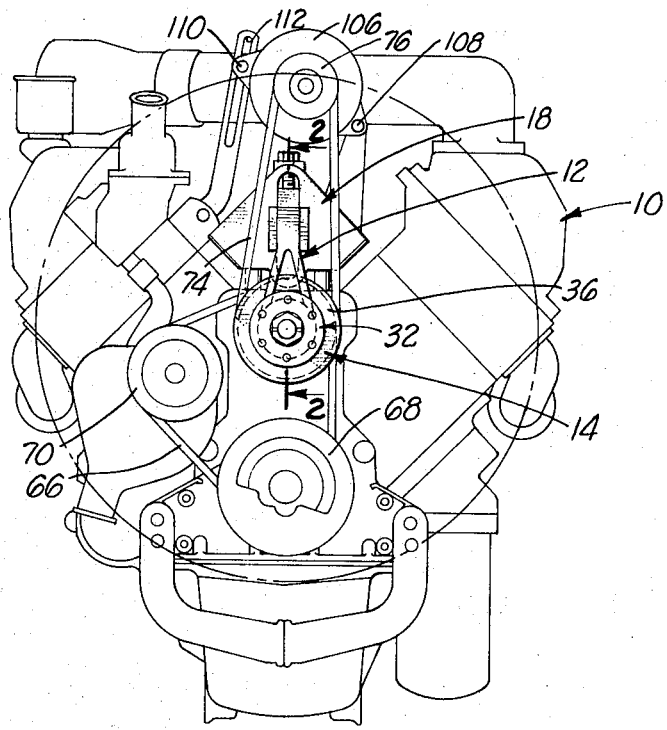
FIG. 1 is a front view of a Cummins V6–200 four-cycle diesel engine having the cooling fan assembly of the invention installed thereon in lieu of the cooling fan assembly with which the engine was originally equipped.

Referring to the drawings, the Cummins V6–200 four-cycle diesel engine mentioned is designated generally therein by the numeral 10. The cooling fan assembly of the invention is designated generally by the numeral 12 and includes a hub assembly 14, an arm 16 for supporting the hub assembly in a location below that of the original-equipment fan assembly, and means 18 for adjustably mounting the supporting arm 16 on the engine 10 in the same location as the original-equipment fan-assembly mounting means. As previously explained, positioning the cooling-fan hub assembly 14 below the original-equipment fan-assembly location results in increased air flow through the radiator, not shown, of the particular engine-radiator combination hereinbefore outlined.

Considering the hub assembly 14 of the invention in more detail first as a matter of convenience, it includes a supporting member 20 carried by the forward, lower end of the supporting arm 16, as by being formed integrally therewith. The supporting member 20 is provided with a rearward end 22 of circular cross section and is provided with an opening 24 therethrough from its forward end to its rearward end. Mounted for rotation within the opening 24 in a manner to be described is a cooling fan shaft 26 provided with forward and rearward ends 28 and 30 respectively projecting forwardly and rearwardly from the supporting member 20.

The shaft 26 is provided at its forward end with means 32 of any suitable construction for mounting cooling fan blades 34 thereon. As is conventional, the fan blades 34 impose a forward thrust load on the shaft 26 which is resisted in a manner to be described.

Connected to the rearward end 30 of the shaft 26 is a forwardly-facing cup-shaped pulley 36 having a forwardly-extending annular skirt 38 which encompasses the cylindrical rearward end 22 of the supporting member 20. In the particular construction illustrated, the pulley 36 is splined onto the shaft 26 and is secured by means of a nut 42 threaded on the rearward end 30 of the shaft and seated against the pulley. The nut 42 also serves a bearing adjustment function as will be described.

Considering the manner in which the shaft 26 is mounted for rotation relative to the supporting member 20, this is accomplished by a rearward, outer bearing 44 and a forward, inner bearing 46. These bearings are capable of resisting axial or thrust loads, as well as radial loads, and may be conical bearings with tapered rollers, as shown.

More particularly, the outer bearing 44 is a large-diameter bearing capable of sustaining radial and forward thrust loads and encompasses the cylindrical rearward end 22 of the supporting member 20, being interposed between the supporting member and the pulley 36. The inner and outer races of the outer bearing 44 are respectively seated against rearwardly-facing and forwardly-facing annular shoulders 48 and 50 respectively formed on the supporting member 20 and the pulley 36. Thus, forward thrust loads produced by the cooling fan blades 34 and transmitted through the shaft 26 to the pulley 36 are resisted by the outer bearing 44.

The outer bearing 44 is located substantially midway between the forward and rearward ends of the pulley 36 so that belt tension loads to be described are applied substantially directly to the outer bearing. Actually, the outer bearing 44 is preferably located slightly forwardly of the midpoint between the forward and rearward ends of the pulley 36 because, in the particular construction illustrated, the belt tension loads are primarily downward. Thus, this location for the outer bearing 44 permits the predominantly downward belt tension load on the pulley 36 to offset the weight of the fan blades 34, thereby minimizing the radial loads on the inner bearing 46.

An important feature of interposing the outer bearing 44 between the supporting member 20 and the pulley 36 is that it permits the use of a large-diameter bearing capable of resisting radial belt tension loads with a minimum of wear, and thus with a long service life. This is an extremely important feature of the hub assembly 14 of the invention.

The inner bearing 46 is disposed in the forward end 52 of the opening 24, such forward end being of circular cross section to accommodate this bearing. The inner bearing 46 is interposed between the supporting member 20 and the shaft 26 and includes inner and outer races respectively seated against rearwardly-facing and forwardly-facing annular shoulders 54 and 56 respectively formed on the shaft 26 and the supporting member 20. As shown, the inner bearing 46 tapers rearwardly so that, with the construction illustrated, it resists any rearward thrust loads on the shaft 26, as well as radial loads thereon. It will be noted that the outer bearing 44 also tapers rearwardly, although, because of its location outwardly of the supporting member 20, it resists forward thrust loads on the shaft 26.

Adverting to the nut 42, it will be apparent that the bearings 44 and 46 may be adjusted by rotating the nut relative to the shaft 26. The desired bearing adjustment may be maintained in any suitable manner, as by a cotter pin 58.

The bearings 44 and 46 may be lubricated in any suitable manner, as by a grease fitting, not shown, communicating with the opening 24 rearwardly of the inner bearing 46. The lubricant is retained by means of inner and outer seals 60 and 62. The inner seal 60 is disposed within the forward end 52 of the opening 24 and is interposed between the supporting member 20 and the shaft 26. The outer seal 62 is located within the skirt 38 of the pulley 36 forwardly of the outer bearing 44, and is interposed between the supporting member 20 and the pulley 36.

In the particular construction illustrated, the pulley 36 is provided with two rear V-grooves 64 for rear V-belts 66 trained around corresponding crankshaft and water-pump pulleys 68 and 70. The pulley 36 is provided with a front V-groove 72 for a front V-belt 74 trained around a generator pulley 76. Since, as shown, the rear V-belts 66 are trained over the pulley 36 and the front V-belt 74 is trained under the pulley 36, the net belt tension load is in the downward direction to at least partially balance the weight of the cooling fan blades 34, as hereinbefore outlined.

Turning now to the adjustable mounting means 18 for the supporting arm 16 carrying the hub assembly 14, such mounting means includes a mounting bracket 80 seated on top of the engine 10 and adapted to be secured by four screws 82 threaded into tapped holes in the top of the engine. The locations of the holes in the mounting bracket 80 for the screws 82 exactly match the locations of the corresponding holes in the original-equipment mounting bracket, not shown. Consequently, the screws 82 for attaching the mounting bracket 80 fit into the same tapped holes in the top of the engine as the screws for the original equipment mounting bracket. Thus, no modification of the engine 10 is required, which is an important feature.

The mounting bracket 80 is provided therein with a vertical guide slot 84 which receives an adjustable member 86 therein. The adjustable member 86 is movable longitudinally of, i.e., vertically in, the guide slot 84 and has the upper, rearward end of the supporting arm 16 connected thereto, as by being formed integrally therewith.

The upper end of the supporting arm 16 is provided on opposite sides of the adjustable member 86 with shoulders 88 engageable with the front side of the mounting bracket 80 on opposite sides of the guide slot 84 therein. The adjustable member 86 is provided with a rearwardly extending stud 90 which projects through a plate 92 engageable with the rear side of the mounting bracket 80 on opposite sides of the guide slot 84 therein. Carried by the stud 90 rearwardly of the plate 92 are a lock washer 94 and a nut 96 for securing the adjustable member 86 in any adjusted position longitudinally of the guide slot 84 by clamping the mounting bracket 80 between the shoulders 88 and the plate 92. Further clamping is provided by a screw 98 extending through the plate 92 below the stud 90 and threaded into the adjustable member 86, there being a lock washer 100 under the head of the screw 98.

The adjustable member 86 is adjusted vertically in the guide slot 84 to adjust the tension in the rear V-belts 66 by means of an adjusting screw 102 extending downwardly through a hole 104 in the upper end of the mounting bracket 80 and threaded into the adjustable member. As will be apparent, by loosening the nut 96 and the screw 98, the adjusting screw 102 may be rotated to position the adjustable member 86 as required to obtain the desired tension in the rear V-belts 66. Thereupon, the nut 96 and the screw 98 are tightened to maintain the desired adjustment. The tension in the front V-belt 74 may be adjusted by shifting the position of a generator 106, which carries the generator pulley 76, in any suitable manner. For example, the generator 106 may be pivotally mounted on the engine 10 at 108, and its angular position about the pivot 108 may be adjusted by a clamping means at 110 movable in a slot 112.

Figure 2:
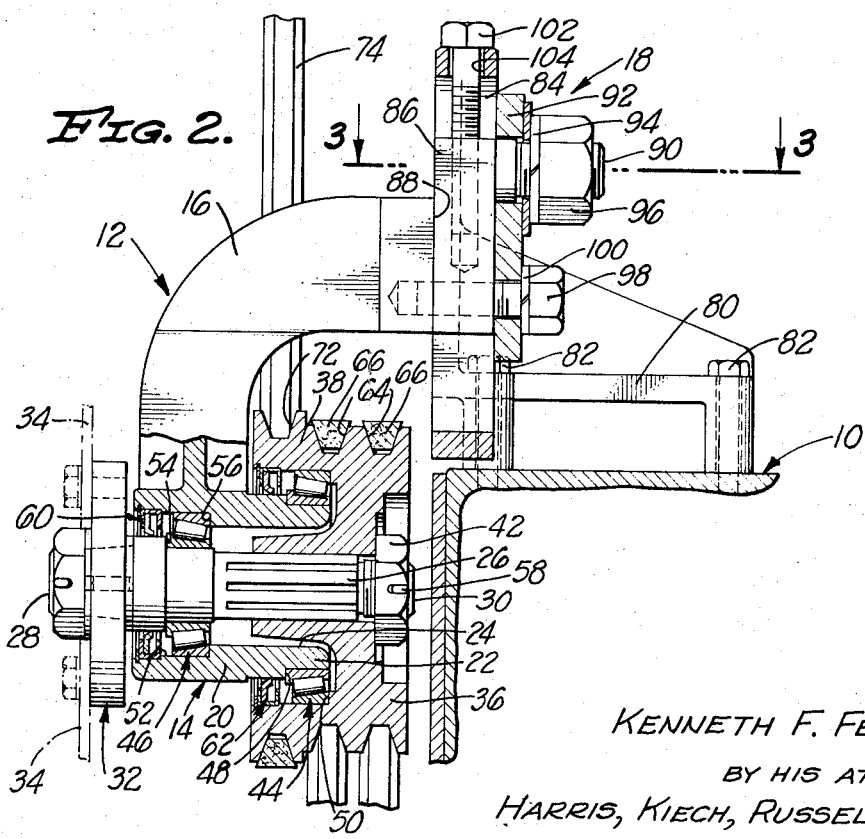
FIG. 2 is an enlarged, fragmentary sectional view taken as indicated by the arrowed line 2—2 of FIG. 1.

It will be noted from FIG. 2 of the drawings that the pulley 36 is located quite close to the front of the engine 10 when the hub assembly 14 is in its operating position, there being insufficient clearance to permit installation or removal of the V-belts 66 and 74. As shown in FIG. 4, the hole 104 is larger than the adjusting screw 102 so that, by loosening the nut 96 and the screw 98, the adjustable member 86 may be tilted, in the central plane of the guide slot 84, in a direction such as to move the pulley 36 forwardly away from the engine 10. This provides the necessary clearance for installation or removal of the V-belts 66 and 74, which is an important feature.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In a cooling fan assembly for an internal combustion engine, the combination of:
   (a) a supporting member having a forward end and having a rearward end of circular cross section;
   (b) said supporting member having an opening therethrough from its forward end to its rearward end;
   (c) said opening being of circular cross section at least at its forward end;
   (d) a shaft projecting axially through said opening and having forward and rearward ends;
   (e) a forwardly-facing cup-shaped pulley connected to the rearward end of said shaft and encompassing the rearward end of said supporting member;
   (f) a bearing capable of sustaining radial and forward thrust loads encompassing the rearward end of said supporting member and interposed between said supporting member and said pulley substantially midway between the forward and rearward ends of said pulley;
   (g) another bearing capable of sustaining radial and rearward thrust loads located within said opening at the forward end thereof and interposed between said supporting member and said shaft;
   (h) means on said shaft at the forward end thereof for mounting a fan thereon;
   (i) a supporting arm for said supporting member extending upwardly and rearwardly from said supporting member; and
   (j) means for mounting the upper, rearward end of said supporting arm on the engine for vertical adjustment of said supporting member relative to the engine.

2. In a hub assembly, the combination of:
   (a) a supporting member having an opening therethrough;
   (b) a shaft projecting axially through said opening and having forward and rearward ends;
   (c) a pulley encompassing said supporting member;
   (d) a bearing capable of sustaining radial and forward thrust loads encompassing said supporting member and interposed between said supporting member and said pulley;
   (e) a bearing capable of sustaining radial and rearward thrust loads located within said opening and interposed between said supporting member and said shaft;
   (f) said bearings being conical roller bearings both of which converge rearwardly of said shaft; and
   (g) threaded means interconnecting said shaft and said pulley for adjusting both of said bearings simultaneously.

3. A hub assembly according to claim 2 wherein said pulley is a forwardly-facing cup-shaped pulley encompassing the rearward end of said supporting member, and wherein said threaded means adjustably connects said pulley to the rearward end of said shaft.

4. A hub assembly as defined in claim 3 wherein the bearing capable of sustaining radial and forward thrust loads is located substantially midway between the forward and rearward ends of said pulley.

No references cited.

FRED C. MATTERN, JR., *Primary Examiner.*

J. A. WONG, *Assistant Examiner.*